MAGNETIC LOGIC DEVICE

Filed April 30, 1959

5 Sheets-Sheet 1

INVENTORS
W.J. DUNNET
A.G. LEMACK
BY F.J. Sullivan
ATTORNEY

INVERT ($\bar{i}$)

OR ($i_1+i_2$)

INVENTORS
W.J. DUNNET
A. G. LEMACK
BY F. J. Sullivan
ATTORNEY

INVENTORS
W. J. DUNNET
A.G. LEMACK
BY F. J. Sullivan
ATTORNEY

FULL ADDER

INVENTORS
W.J. DUNNET
A.G. LEMACK
BY F.L. Sullivan
ATTORNEY

THREE BIT DECODER

INVENTORS
W.J. DUNNET
A.G. LEMACK
BY F.L. Sullivan
ATTORNEY 3,171,970
MAGNETIC LOGIC DEVICE Wallace J. Dunnet, Fayville, and Alvin G. Lemack, West Roxbury, Mass., assignors to Sylvania Electric Products Inc., a corporation of Delaware Filed Apr. 30, 1959, Ser. No. 810,139
5 Claims. (Cl. 307—88)

This invention is concerned with electronic data processing circuitry, and particularly with the performance of logical operations in such circuitry.

Square hysteresis loop magnetic core materials such as the ferrites and thin tapes, when employed in a toroidal core configuration, are commonly used to perform common logical functions such as OR, INHIBIT, and INVERT. It is possible to switch these core materials from negative to positive saturation flux density within several hundred millimicroseconds using less than a hundred milliwatts of peak power. Cores themselves would then appear to be capable of operating in a sequential type system at clock speeds in excess of one megacycle. However, in a practical system, achievement of the fast switching time and corresponding low power consumption is difficult, primarily due to the problems encountered in directly coupling one core with another. Thus, transistors and diodes are often used as coupling devices between cores.

A primary objective of this invention is to optimize the use of cores and transistors in this type of circuit so that the transistors will perform logical as well as coupling and regenerative functions, thereby increasing the overall efficiency of the system. Other objectives are to provide improved data processing techniques, and a more efficient circuit combination of transistors and cores.

These and related objectives are accomplished, in one embodiment of the invention, with a system which comprises a plurality of transistors interconnected in a variety of logical configurations with each transistor having as its input a magnetic core with a plurality of input windings in various logical relationships.

This embodiment of the invention will be explained in more detail, and other features, embodiments, and modifications of the invention will be apparent from this explanation and reference to the accompanying drawings, wherein.

Figure 1:
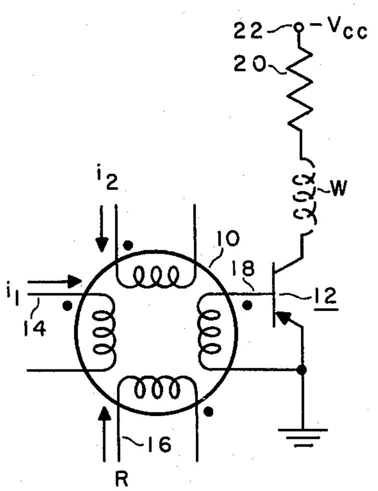
FIG. 1 is a schematic diagram of a single core-transistor combination.
Figure 9:
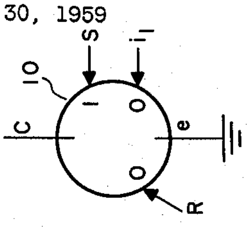
Figure 8:
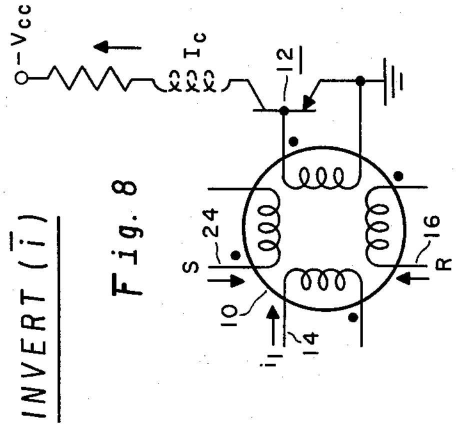
Figure 10:
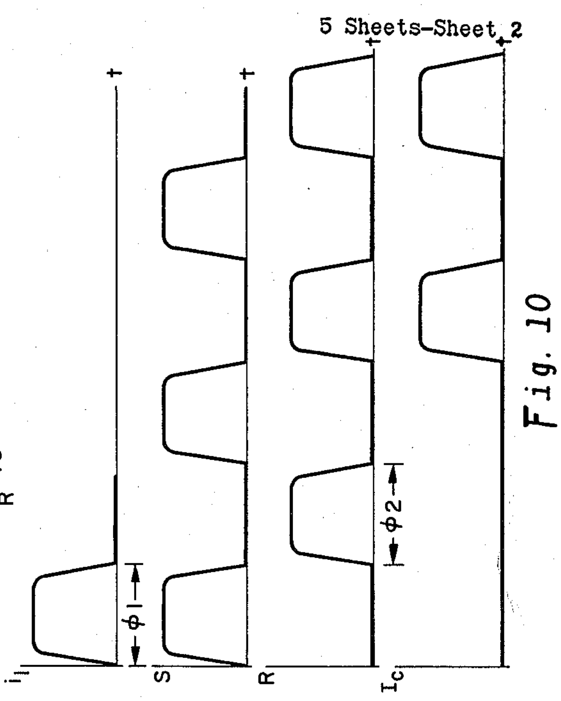
Figure 5:
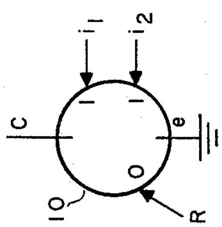
Figure 6:
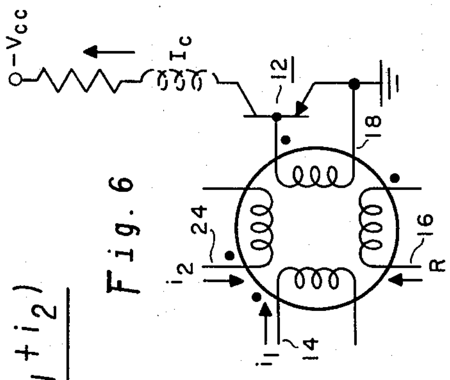
Figure 7:
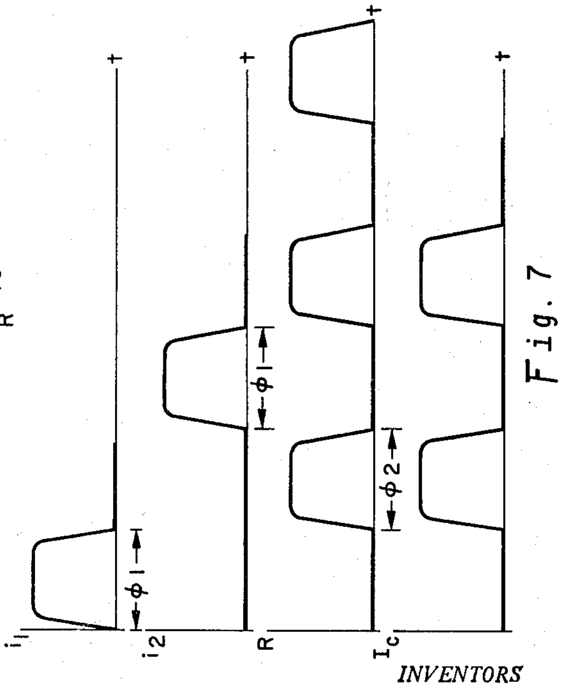
Figures 11, 12, 13, 14, 15:
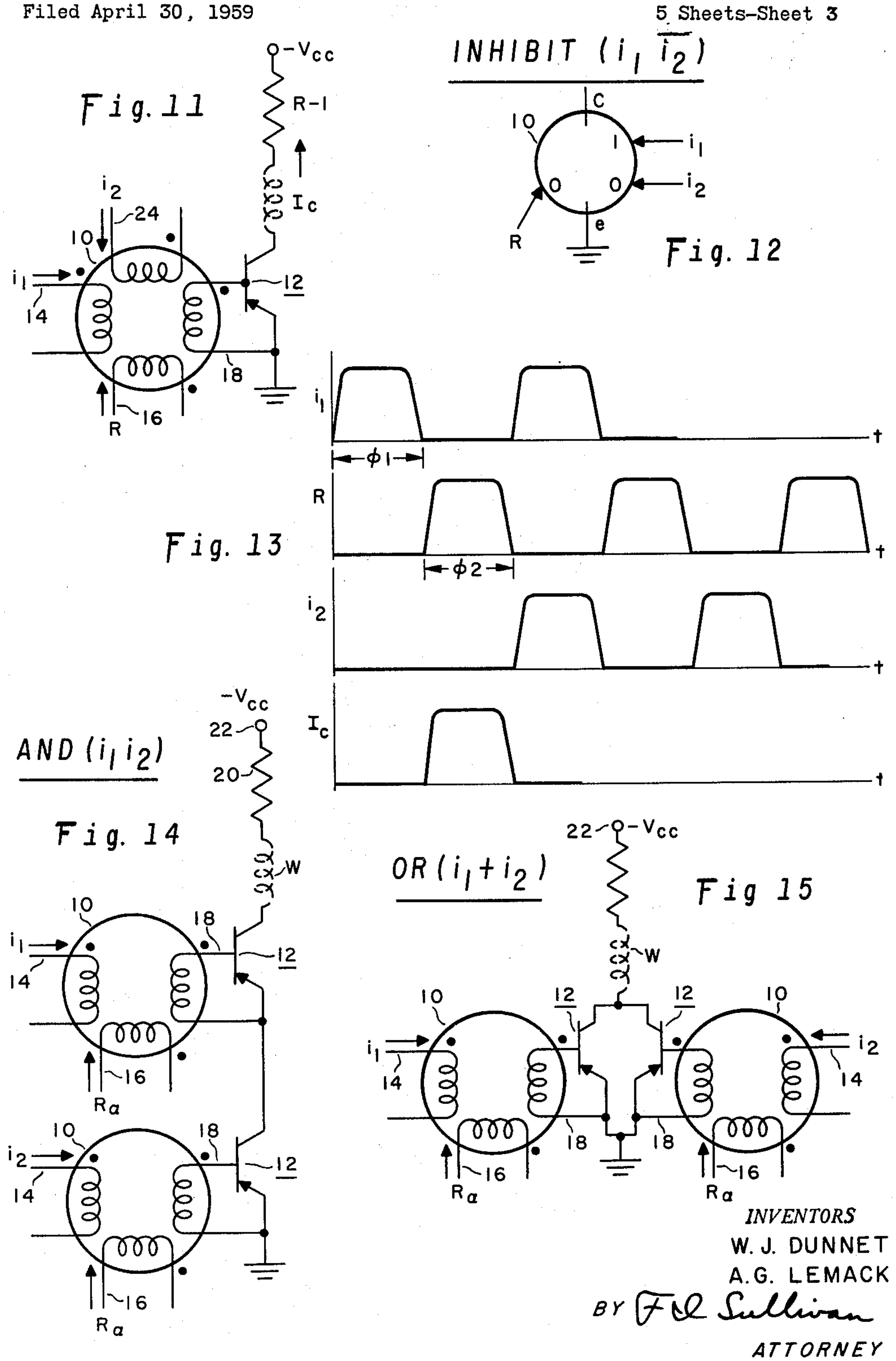
Figures 16, 17, 18:
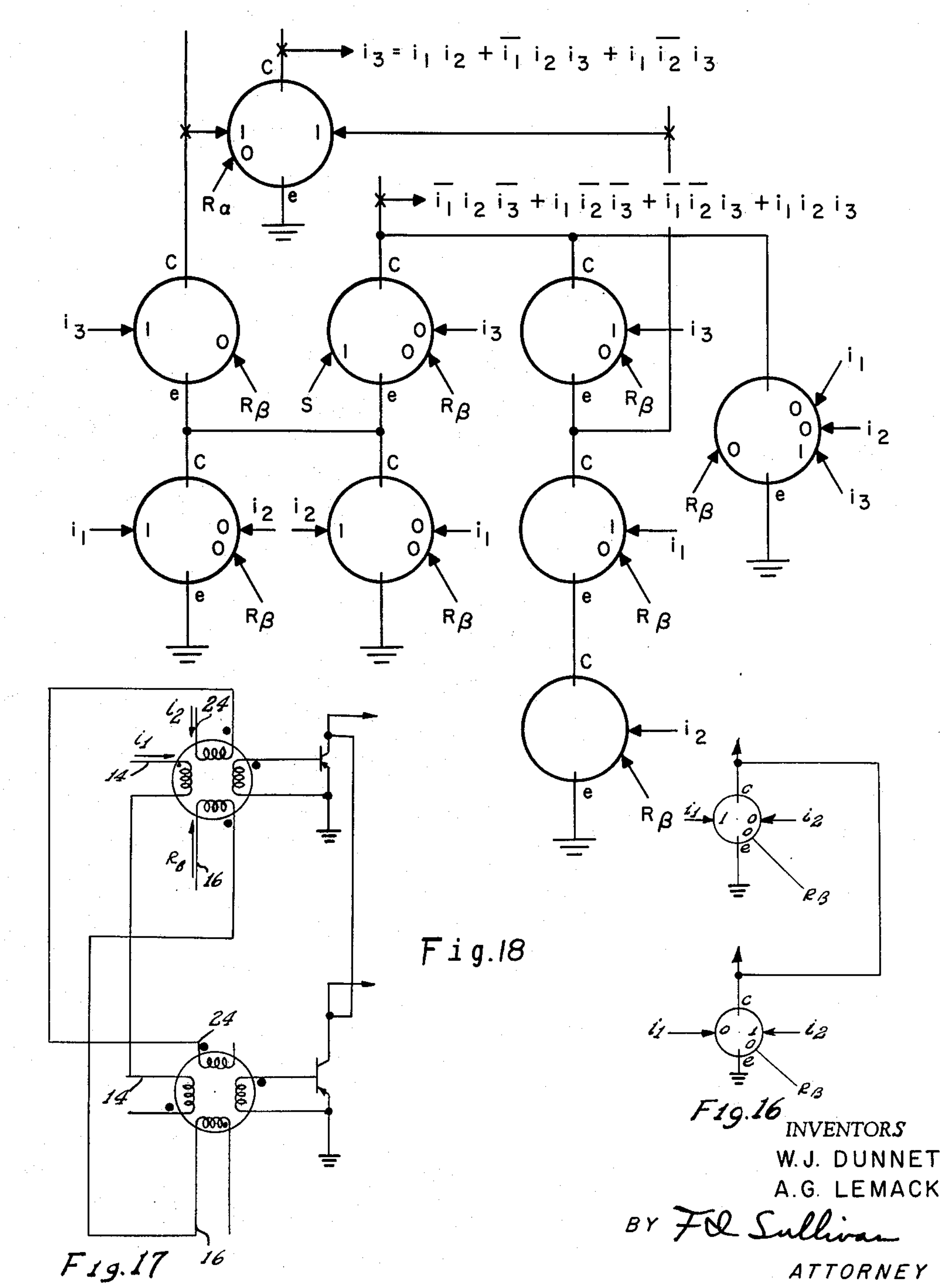
Figure 19:
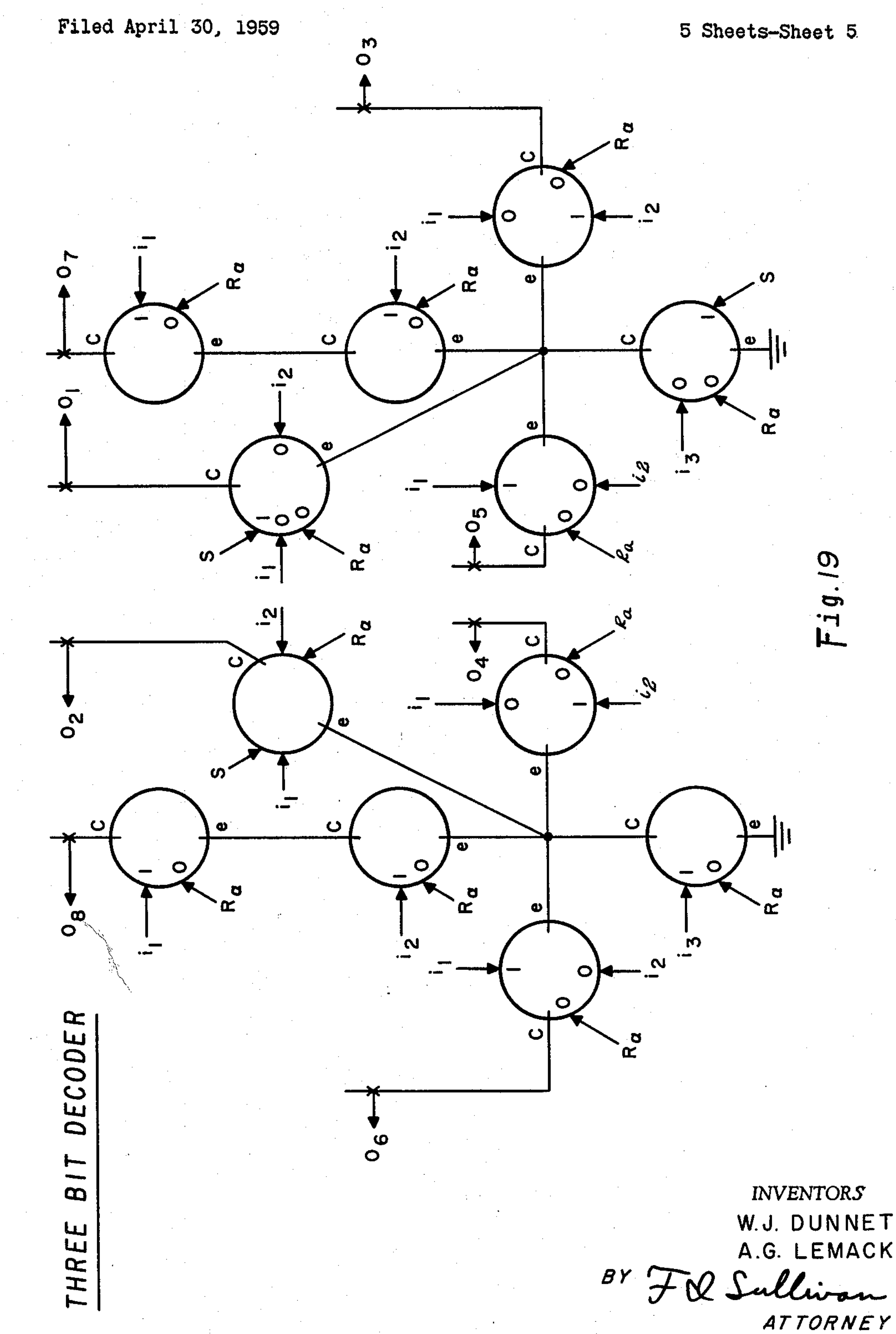

FIGS. 5, 6, and 7 are, respectively, schematic, symbolic and pulse timing diagrams of the implementation of a logical OR function;

FIGS. 8, 9, and 10 are similar representatives of an INVERT function;

FIGS. 11, 12, and 13 represent an INHIBIT function;

FIG. 14 is a schematic diagram of two of the units of FIG. 1 in a logical AND configuration;

FIG. 15 is a schematic diagram of two of the units of FIG. 1 in a logical OR configuration;

FIGS. 16 and 17 are, respectively, symbolic and schematic diagrams showing the manner in which a single input winding links a number of cores;

FIG. 18 is a symbolic diagram of a full adder embodying the invention; and,

FIG. 19 is a symbolic diagram of a three bit decoder embodying the invention.

FIG. 1 shows a core-transistor combination. As shown, the core 10 performs storage and logical functions. The transistor 12 is used to provide power gain and isolation between driving and driven cores. Referring to the idealized hysteresis loop in FIG. 3, and the pulse timing diagram in FIG. 4, the operation of the circuit is as follows.

Figure 3:
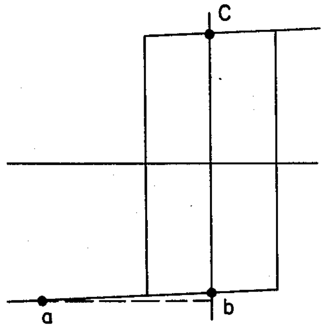
FIG. 3 is a diagram of an idealized hysteresis loop for the core of the other figures.
Figure 4:
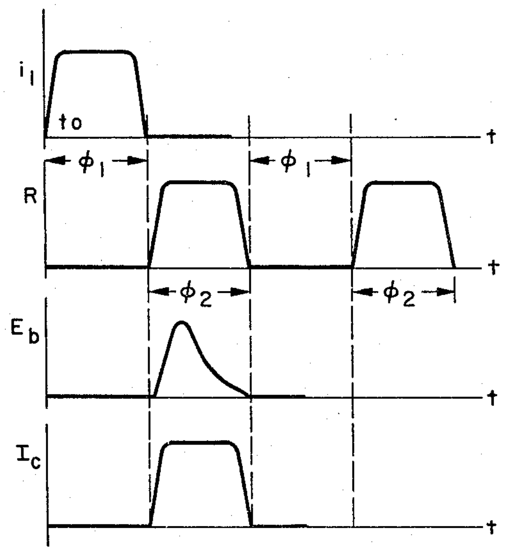
FIG. 4 is a pulse timing diagram illustrating the operation of the combination of FIG. 1.

At time $t_0$ the flux level in the core 10 is at point $b$, as shown in FIG. 3. During the interval $\phi_1$, a current pulse $i_1$ is applied to input winding 14. This pulse is of sufficient amplitude and duration to cause the flux level in the core to be set to point $c$. When this switching occurs, a voltage is induced, positive at the polarity markings, in windings 16 and 18. Negligible current occurs in each of these windings during this interval. Reset winding 16 is terminated with the high impedance of an off reset current supply, and output winding 18 is terminated with the high back impedance of the transistor emitter diode.

During the interval, $\phi_2$, the input pulse is removed and a reset current pulse, R, is applied to winding 16. The direction of the reset pulse is such that the flux level in the core is restored to point $b$. This change in flux induces a voltage negative at the polarity markings, in windings 14 and 18.

Input winding 14 is terminated with the high impedance of an off input current source; and, the induced voltage in winding 18 is of proper polarity and sufficient magnitude to switch transistor 12 into saturation. A path for current is then provided from ground through the transistor, the load resistor 20, and the input windings W of any logically connected cores, to the negative potential $V_{cc}$ applied at terminal 22.

If an input pulse does not appear at winding 14 during interval $\phi_1$, the core 10 remains at point $b$. Upon application of a reset pulse during interval $\phi_2$, the core is driven out to point $a$. The small change in flux that occurs produces a spike of voltage, negative at the polarity markings, in the various windings on the core. However, this spike of voltage is relatively ineffective in causing collector current, due to the nonlinear transfer characteristic of the transistor. In higher speed designs, at one megacycle, for example, a relatively large spike of current can be tolerated in the input windings of driven cores because narrow spikes (0.1 microsecond) for the most part cause elastic flux changes.

Regeneration of the core output pulse width as well as amplitude can be accomplished by the transistor. This regeneration is obtained by controlling the transistor storage time. A small amount of energy is stored in the magnetic core as it is driven into saturation during reset. This energy is released during the fall time of the reset current pulse and aids in sweeping minority carriers out of the base region of the transistor. Core output pulse shape and the maximum transistor hole storage must also be considered in order to prevent excessive widening of the collector pulse.

LOGIC DESIGN SYMBOLISM

A description of the simple OR, INVERT and INHIBIT functions of these circuits, as well as of the more complex functions, can be simplified by an explanation of input and output pulse timing and by the adoption of a symbolic representation of the core-transistor combination.

This explanation will concern itself with a two-phase synchronous system. In this type of system two equal master clock intervals (phases) $\alpha$ and $\beta$, along with two equal local clock phases, $\phi_1$ and $\phi_2$, are employed. During its input phase, $\phi_1$, a core 10 may or may not be set, depending upon which of the possible input pulses appear and which are absent. During its output phase, $\phi_2$, the core is reset, providing it had been set during its previous input interval $\phi_1$, and a pulse of current occurs in the collector of its associated transistor 12.

If $\phi_2$ occurs during master clock phase $\alpha$, the core-transistor combination is said to be in mode $\alpha$. Similarly, if $\phi_2$ occurs during master clock phase $\beta$, the combination is said to be in mode $\beta$. In these two-phase synchronous systems, implemented with magnetic circuits, information is shifted from a circuit operating in one mode to another circuit operating in the other mode.

Figure 2:
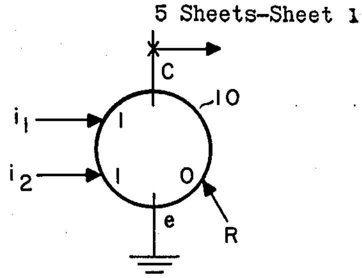
FIG. 2 is a symbolic diagram of the combination of FIG. 1.

The schematic representation of the core-transistor combination of FIG. 1 can be simplified through the adoption of the symbolism of FIG. 2. A circle represents the core 10, and an arrow pointing to the circle represents an input to the core, setting it to the binary state indicated just inside the circle. The reference character on the input arrow indicates the data designation. If an input signal appears, it will always be during local clock phase $\phi_1$. R represents a reset function which always appears during local clock interval $\phi_2$. The subscripts $\alpha$ and $\beta$ are used to denote the master clock interval during which R occurs. Similarly, S represents a setting function which is also unconditional in its appearance and always appears during a local clock phase $\phi_1$. In order to simplify the symbolic circuit, the transistor 12 has been omitted. However, the transistor collector and emitter are shown as follows. A "$c$" at the intersection of a line and a circle indicates a connection with the collector. Similarly, an "$e$" at the intersection of a line and a circle indicates a connection with the transistor emitter.

When symbolic circuits are interconnected, the appearance of an "$x$" at the junction of a line associated with the collector of a transistor and an input arrow indicates that the core winding associated with the input is in series with the collector. A dot at the intersection of lines associated with collectors indicates a voltage connection.

LOGICAL FUNCTIONS PERFORMED BY A SINGLE CORE-TRANSISTOR COMBINATION

Through the use of two input windings, an output and a reset winding, the logical functions OR, INVERT and INHIBIT can be performed by the magnetic core-transistor combination of FIG. 1. Since logic performed with cores is known in the art, it will be described only briefly here.

FIGS. 5–7 show the timing of input and output pulses and arrangement of core windings required to perform an OR function, $i_1+i_2$. If either input $i_1$ or $i_2$ at windings 14 and 24 respectively is present, core 10 will be set. During interval $\phi_2$ the rest function, R, resets the core. The resulting change in flux induces a voltage in the core output winding. This pulse of voltage is of sufficient amplitude to switch transistor 12 into saturation and cause a pulse of current, $I_c$, to occur in the collector. If both $i_1$ and $i_2$ are absent, the core will not be set. During interval $\phi_2$ the reset function, R, effects little change of core flux. As a result the transistor remains off and there is no collector current pulse.

The INVERT function $\bar{i}_1$ can be obtained as shown in FIGS. 8–10. The setting function S appears every input clock interval $\phi_1$. If input $i_1$ is present, S is prevented from setting the core, that is, the magnetomotive forces due to $i_1$ and S oppose each other resulting in a zero net magnetomotive force and therefore no core flux is changed. During interval $\phi_2$, the reset function, R, brings about little change of core flux. As a result transistor 12 remains off and there is no collector output pulse. If input $i_1$ is absent, the setting function S will set the core. During interval $\phi_2$, the core is reset and an output pulse will occur in the collector of the transistor.

FIGS. 11–13 show the timing of input and output pulses and arrangement of core windings required to perform the INHIBIT function $i_1\bar{i}_2$. If only input $i_1$ is present the core 10 is set and an output pulse will occur in the collector of the transistor 12 during the next reset interval $\phi_2$. If both $i_1$ and $i_2$ are present, the core is not set because the magnetomotive forces due to $i_1$ and $i_2$ cancel. As a result there is no output collector pulse during interval $\phi_2$. Finally, if $i_2$ alone is present again the core is not set because the magnetomotive force due to $i_2$ is in such a direction as to keep the core in negative saturation, and there is no output pulse during $\phi_2$.

LOGIC SHARING

In accordance with this invention, considerable savings in components and a reduction in system delay is achieved by causing transistors to cooperate with cores in performing logical functions. This is accomplished, for example, by operating the core-transistor combinations in such a manner that a number of cores operating in the $\alpha$ mode are set during $\phi_1$ and reset during $\phi_2$. During this reset period they in turn set combinations whose cores are operating in mode $\beta$. Thus, with appropriate serial stacking and parallel shunting of the transistors involved a second logical function resulting from the transistor arrangement is cascaded upon the logical functions achieved by the setting of the cores. For example, when two core-transistor combinations are stacked as shown in FIG. 14 the transistors perform an AND function and the cores perform OR, INVERT, or INHIBIT functions; and when the transistors of two core-transistor combinations are arranged in shunt as shown in FIG. 15, the transistors perform an OR function and the cores perform OR, INVERT, or INHIBIT functions. Table I lists some of the switching functions of two, three and four variables that can be obtained from a pair of stacked or shunted combinations.

*Table I*

| $i_1, i_2$ | $i_1, i_2, i_3$ | $i_1, i_2, i_3, i_4$ |
|---|---|---|
| $i_1i_2$ | $\bar{i}_1\bar{i}_2i_3$ | $(i_1+i_2)(i_3+i_4)$ |
| $\bar{i}_1\bar{i}_2$ | $\bar{i}_1i_2i_3$ | $\bar{i}_1\bar{i}_2i_3i_4$ |
| $i_1\bar{i}_2$ | $\bar{i}_1\bar{i}_2\bar{i}_3$ | $\bar{i}_1\bar{i}_2\bar{i}_3\bar{i}_4$ |
| $i_1+i_2$ | $i_1i_3+i_2i_3$ | $\bar{i}_1\bar{i}_2\bar{i}_3i_4$ |
| $\bar{i}_1+i_2$ | $i_1\bar{i}_3+i_2\bar{i}_3$ | $i_1+i_2+i_3+i_4$ |
| $\bar{i}_1+\bar{i}_2$ | $i_1+i_2+i_3$ | $\bar{i}_1+i_2+\bar{i}_3+i_4$ |
| $\bar{i}_1+i_1\bar{i}_2$ | $\bar{i}_1+i_2+i_3$ | $i_1\bar{i}_2+i_3\bar{i}_4$ |
| $i_1i_2+\bar{i}_2\bar{i}_1$ | $\bar{i}_1+\bar{i}_2i_3$ | $\bar{i}_1+\bar{i}_2\bar{i}_3i_4$ |
| | $\bar{i}_1+i_1\bar{i}_2\bar{i}_3$ | $i_1+\bar{i}_2i_3i_4$ |
| | $\bar{i}_1i_2+i_1\bar{i}_2\bar{i}_3$ | $i_1\bar{i}_2+i_2\bar{i}_3\bar{i}_4$ |
| | $\bar{i}_1\bar{i}_2i_3+i_1\bar{i}_2\bar{i}_3$ | $i_1\bar{i}_2i_3+\bar{i}_1\bar{i}_4$ |
| | $i_1+\bar{i}_2i_3$ | $\bar{i}_1\bar{i}_2+\bar{i}_3\bar{i}_4$ |
| | $i_1+\bar{i}_1\bar{i}_2i_3$ | |

In FIG. 16, two cores are symbolically shown having input arrows with the same current designations, i.e. $i_1$, $i_2$, and $R_\phi$. The associated circuit diagram is depicted in FIG. 17, demonstrating the manner in which these currents are applied to the cores. Current $i_1$ from a driving transistor (not shown) is applied to the input of each core by passing through input winding 14 linking the two cores. In like manner, winding 24 links both cores to carry $i_2$ and winding 16 links both cores to carry current $R_\phi$. Thus, whenever two or more cores in symbolic FIGS. 18 and 19 depict the same input current, a single input winding links each core and conducts this current.

More complex systems may be constructed by stacking and shunting other core-transistor combinations . For example, the Boolean expressions, defining a full adder (see Richards, R. K., Arithmetic Operations in Digital Computers, D. Van Nostrand Company Inc., 1955, pp. 89–90) are:

$$\text{Sum}=i_1\bar{i}_2\bar{i}_3+\bar{i}_1i_2\bar{i}_3+\bar{i}_1\bar{i}_2i_3+i_1i_2i_3$$

$$\text{Carry}=\bar{i}_1i_2i_3+i_1\bar{i}_1i_3+i_1i_2$$

These expressions can be implemented as shown in FIG. 18.

The use of these combinations is not restricted to the performance of logical functions. Shifting and coding may also be performed. For example, FIG. 19 shows twelve core-transistor combinations arranged so that they decode a three-bit binary number. Table II lists the eight switching functions that describe this three-bit decoder wherein cores and transistors share in the performance of the logical function.

*Table II*

| Output | Input Function |
|---|---|
| $O_1$ | $\bar{i}_1\bar{i}_2\bar{i}_3$ |
| $O_2$ | $\bar{i}_1\bar{i}_2 i_3$ |
| $O_3$ | $\bar{i}_1 i_2\bar{i}_3$ |
| $O_4$ | $\bar{i}_1 i_2 i_3$ |
| $O_5$ | $i_1\bar{i}_2\bar{i}_3$ |
| $O_6$ | $i_1\bar{i}_2 i_3$ |
| $O_7$ | $i_1 i_2\bar{i}_3$ |
| $O_8$ | $i_1 i_2 i_3$ |

The invention is not limited to the specific examples, features and logical combinations shown and described; but is to be accorded the full scope of the following claims.

What is claimed is:

1. In an electronic data processing system: a plurality of ferrite cores each having a substantially square-loop hysteresis characteristic; a plurality of separate input windings each linking a number of said cores and arranged to coact with one another to perform a first set of logical functions within given ones of said cores; a plurality of transistors each having base, collector, and emitter electrodes; a separate output winding linking each of said cores and connected to the base electrode of a separate one of said transistors; and, means connecting combinations of said transistors in separate groups to different ones of said input windings in arrangements operative to perform a second set of logical functions whereby said cores and said transistors in coaction with one another are operative to perform a cascaded series of logical functions.

2. In an electronic data processing system: a plurality of electromagnetic elements having a substantially square-loop hysteresis characteristic whereby said elements may be set to one state of remanent magnetic flux and reset to another state of flux in a repetitive two-phase cycle; a plurality of separate input windings each linking a number of said elements and arranged to coact with one another to control the setting of the individual elements, thereby performing a first series of logical functions on electronic data under process in the system; means for causing all of said elements to be set and reset in synchronism, but with some of said elements being set while others are reset thereby producing an $\alpha$ and a $\beta$ grouping of said elements; a plurality of transistors each having base, collector and emitter electrodes; a separate output winding linking each of said elements and connected to the base electrode of a separate one of said transistors; means connecting said transistors in a plurality of combinations to different ones of said input windings in arrangements adapted to perform a second series of logical functions on said processed data; and, means whereby $\alpha$ groups of magnetic elements are connected via said groupings of transistors to $\beta$ groups of elements, and vice versa, thereby providing a cascading of said first and second series of logical functions.

3. The invention according to claim 2 wherein said first series of logical functions comprise OR, INVERT, and INHIBIT operations.

4. The invention according to claim 2 wherein said second series of logical functions comprise AND and OR operations.

5. The invention according to claim 2 wherein said first series of logical functions comprise OR, INVERT and INHIBIT operations, and said second series of logical functions comprise AND and OR operations.

References Cited by the Examiner

UNITED STATES PATENTS

| | | | |
|---|---|---|---|
| 2,695,993 | 11/54 | Haynes | 307—88 X |
| 2,747,110 | 5/56 | Jones | 307—88 |
| 2,785,236 | 3/57 | Bright et al. | 307—88 |
| 2,852,699 | 9/58 | Ruhman | 307—88 |
| 2,857,586 | 10/58 | Wylen | 340—174 |
| 2,866,178 | 12/58 | Lo et al. | 307—88 |
| 2,905,833 | 9/59 | Miehle | 340—174 |
| 2,911,626 | 11/59 | Jones et al. | 340—174 |
| 2,952,841 | 9/60 | Lund | 340—174 |
| 2,991,457 | 7/61 | Hoffman et al. | 340—174 |
| 3,022,428 | 2/62 | Carey | 307—88 |

FOREIGN PATENTS

| | | |
|---|---|---|
| 748,558 | 5/56 | Great Britain. |

IRVING L. SRAGOW, *Primary Examiner.*

E. R. REYNOLDS, *Examiner.*